US 8,316,815 B2

(12) United States Patent
Negoro et al.

(10) Patent No.: US 8,316,815 B2
(45) Date of Patent: Nov. 27, 2012

(54) OIL STORAGE STRUCTURE FOR ENGINE, ENGINE INCORPORATING SAME, AND VEHICLE INCORPORATING SAME

(75) Inventors: Masaaki Negoro, Saitama (JP); Hiroshi Tadokoro, Saitama (JP); Takanori Osuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 450 days.

(21) Appl. No.: 12/721,762

(22) Filed: Mar. 11, 2010

(65) Prior Publication Data

US 2010/0242893 A1 Sep. 30, 2010

(30) Foreign Application Priority Data

Mar. 31, 2009 (JP) ................................ 2009-087453

(51) Int. Cl.
*F02B 77/00* (2006.01)
(52) U.S. Cl. ............. 123/195 C; 123/196 R; 123/198 E; 184/6.5
(58) Field of Classification Search ............... 123/195 C, 123/196 R, 195 R, 198 C, 198 E; 184/106, 184/6.5, 6.13, 6.23, 6.12
See application file for complete search history.

(56) References Cited

U.S. PATENT DOCUMENTS

| | | | | |
|---|---|---|---|---|
| 4,993,374 A * | 2/1991 | Okui | ........................ | 123/90.31 |
| 5,092,292 A | 3/1992 | Iguchi et al. | | |
| 5,099,945 A * | 3/1992 | Okui et al. | ..................... | 180/297 |
| 6,305,342 B1 * | 10/2001 | Narita et al. | .............. | 123/196 R |
| 7,717,234 B2 * | 5/2010 | Mizuno et al. | ................. | 184/6.5 |
| 2006/0288976 A1 | 12/2006 | Watanabe | | |

FOREIGN PATENT DOCUMENTS

| | | |
|---|---|---|
| JP | 02-227510 A | 9/1990 |
| JP | 2578284 B2 | 11/1996 |
| JP | 3052002 B2 | 4/2000 |

* cited by examiner

*Primary Examiner* — Noah Kamen
*Assistant Examiner* — Hung Q Nguyen
(74) *Attorney, Agent, or Firm* — Carrier Blackman & Associates, P.C.; Joseph P. Carrier; William D. Blackman

(57) ABSTRACT

An internal combustion engine includes an oil storage structure defining an oil storage chamber provided for storing oil therein. The engine is configured such that a crankcase cover, covering a clutch mechanism, is joined to a crankcase for forming an oil storage chamber. The oil storage structure is applied to an engine having a vertically split crankcase, and is configured to prevent the clutch mechanism from dipping into stored oil so that clutch disengagement performance is not affected, and reliability of the liquid-tight sealing performance is extended. The crankcase cover is formed with a partition wall extending along the outer circumference of the clutch mechanism. The partition wall splits a space between the crankcase and the crankcase cover into two chambers. Of these chambers, a chamber separate from a clutch mechanism is used as the oil storage chamber, which is formed only by a lower crankcase and the crankcase cover.

20 Claims, 7 Drawing Sheets

OIL STORAGE STRUCTURE FOR ENGINE, ENGINE INCORPORATING SAME, AND VEHICLE INCORPORATING SAME

CROSS-REFERENCE TO RELATED APPLICATIONS

The present invention claims priority under 35 USC 119 based on Japanese patent application No. 2009-087453, filed on Mar. 31, 2009. The entire subject matter of this priority document, including the specification, claims and drawings thereof, is incorporated by reference herein.

BACKGROUND OF THE INVENTION

1. Field of the Invention

The present invention relates to an oil storage structure for a small-sized vehicle engine, and to an engine and a vehicle incorporating the same. More particularly, the present invention relates to an oil storage structure including an oil storage chamber formed by a partition wall splitting a space between a crankcase and a crankcase cover of an engine, and to an engine and a vehicle incorporating the same.

2. Description of the Background Art

There are known conventional engines, in which a crankshaft chamber is isolated from a transmission chamber, and an oil pump (scavenging pump) is adapted to draw in oil from the oil pan, and to supply pressurized oil to the crankshaft chamber and the transmission chamber. Oil is stored in an oil pan disposed below the crankshaft chamber, and in the transmission chamber communicating with the oil pan. An example of such known arrangement of the transmission chamber and the clutch chamber is disclosed in the Japanese Patent No. 2578284, specifically in FIG. 8 thereof.

In such a known engine configuration, gears of a transmission unit (mechanism) do not dip into the oil. Therefore, the transmission chamber and the clutch chamber are allowed to communicate with each other, so that oil is also stored in the clutch chamber. Thus, the height of the oil can be suppressed to a lower level compared with the transmission chamber alone.

However, if the transmission chamber is allowed to communicate with the clutch chamber, as stated above, the lowest end of a clutch is usually located at a position lower than the transmission gears. This leads to a problem that the clutch dips into the oil. Under conditions where a portion of the clutch constantly dips into oil, oil-separation performance between clutch plates lowers, which problematically affects the disengagement performance of the clutch.

In order to solve such problem, there is a known engine, in which an oil storage chamber for storing oil therein is formed so as to avoid the outer circumference of a clutch. An example of such engine is disclosed in the Japanese Patent No. 3052002, specifically in FIG. 7 thereof (in which an oil tank is shown by reference numeral 51).

However, in the case where the oil storage chamber is formed so as to avoid the clutch, it is necessary to form a vertically long oil storage chamber for ensuring that a sufficient volume of oil is stored in the oil storage chamber.

In a conventional engine, since the crankcase is split into right and left crankcase halves, one of the right and left cases and a clutch cover can constitute the oil storage chamber. However, if such configuration is used for the crankcase formed in a vertically split manner, the oil storage chamber will be formed by the upper and lower crankcases and the clutch cover. If the oil storage chamber is formed so as to straddle the three components, e.g. the upper and lower crankcases and the clutch cover, as described above, there arises a problem in that it is difficult to ensure a well sealed liquid-tight performance of the oil storage chamber.

The present invention has been made to overcome such drawbacks of previously known configurations of the oil storage chamber. Accordingly, it is one of the objects of the present invention to provide an oil storage structure for an engine provided with a vertically split crankcase, in which a clutch mechanism does not dip into oil so as not to affect clutch disengagement performance.

It is another object of the present invention to provide an oil storage structure for an engine which is arranged so that liquid-tight sealing performance of the oil storage chamber is reliably ensured.

SUMMARY OF THE INVENTION

In order to achieve the above objects, the present invention according to a first aspect thereof provides an oil storage structure for an engine. The oil storage structure includes an oil storage chamber adapted to store oil therein. The engine includes a crankcase rotatably supporting a crankshaft and a transmission shaft and forming at least a transmission chamber, a clutch provided on an end portion, of the transmission shaft, projecting laterally from the crankcase, and a crankcase cover joined to the crankcase for forming the oil storage chamber.

The present invention according to the first aspect thereof is characterized in that: the crankcase is vertically split crankcase, i.e., the crankcase includes an upper crankcase and a lower crankcase; the crankshaft is disposed between the upper and lower crankcases; the crankcase cover is formed with a partition wall extending along an outer circumference of the clutch mechanism as viewed from an direction of the transmission shaft; the partition wall splits a space between the crankcase and the crankcase cover into a plurality of chambers, of the plurality of chambers, a chamber separate from a clutch mechanism (clutch device) is used as the oil storage chamber, and an upper edge portion of the partition wall is at least partially disposed along a case-split surface so that the oil storage chamber may be formed only by the lower crankcase and the crankcase cover.

The present invention according to a second aspect thereof, in addition to the first aspect, is characterized in that the partition wall extends along the outer circumference of the clutch mechanism, then further extends along an outer circumference of a primary drive gear driven by the crankshaft for driving the clutch mechanism, and merges with the upper edge portion extending along a crankcase plain surface portion including the crankshaft. The upper edge portion further merges with a front wall and a lower wall of the oil storage chamber, thereby annularity, and consequently forming the oil storage chamber as a closed chamber.

The present invention according to a third aspect thereof, in addition to one of the first and second aspects, is characterized in that the engine is provided with a balance shaft disposed below the crankshaft, a scavenging pump for supplying pressurized oil to the oil storage chamber is coaxially joined to an end portion of the balance shaft and is driven by the balance shaft. The scavenging pump is disposed in the oil storage chamber.

The present invention according to a fourth aspect thereof, in addition to the third aspect, is characterized in that a feed pump adapted to feed oil from the oil storage chamber to various portions and components of the engine is provided coaxially with the scavenging pump, and an oil filter connected to an oil passage located on a discharge side of the feed pump is provided at a front wall of the crankcase adjacent to the oil storage chamber.

The present invention according to a fifth aspect thereof, in addition to one of the first through fourth aspects, is characterized in that an oil suction pipe extending along a lower portion of the oil storage chamber is connected to a suction side of the feed pump.

EFFECTS OF THE INVENTION

According to the first aspect of the present invention, the partition wall extending along the outer circumference of the clutch mechanism splits the space between the crankcase and the crankcase cover into the plurality of chambers, and the chamber not including the clutch mechanism is used as the oil storage chamber. Thus, since the clutch mechanism does not dip into oil, the disengagement performance of the clutch is ensured without affecting the clutch release performance.

In addition, since the oil storage chamber of the engine formed by the vertically split crankcase is formed only by the lower crankcase so as not to straddle the upper and lower crankcases, the amount of oil stored can be ensured at a maximum level, while ensuring liquid-tight performance of the oil storage chamber.

According to the second aspect of the present invention, the oil storage chamber is formed as the closed chamber by the partition wall avoiding the clutch mechanism, and the primary drive gear, and by merging the upper edge portion of the crankcase and the front wall and lower wall of the oil storage chamber. Therefore, the stored oil will not be stirred by the clutch and the drive gears. Thus, the bubbling of the oil is suppressed to slow the progression of the degradation of the oil. In addition, air entrainment can be suppressed on the oil supply side.

According to the third aspect of the present invention, the vacant space occurs on the end portion side of the balance shaft axially shorter than the crankshaft and the transmission shaft. Such vacant space is used for forming the oil storage chamber, in which the scavenging pump is disposed.

The scavenging pump is drivingly connected to the end portion of the balance shaft and is driven by the balance shaft. Thus, the oil storage chamber is not enlarged in the direction of the crankshaft thereby providing a compact configuration of the engine. Further, the pump drive mechanism can be simplified so that the overall engine can be downsized.

According to the fourth aspect of the present invention, the oil storage chamber, the scavenging pump, the feed pump and the oil filter are collectively arranged in the front portion of the crankcase. Thus, the oil passage fluidly connecting the oil storage chamber, the scavenging pump, the feed pump and the oil filter together can be shortened for achieving a compact configuration of the engine.

According to the fifth aspect of the present invention, the oil collected on the lowest portion of the oil storage chamber can reliably be sucked through the suction pipe.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
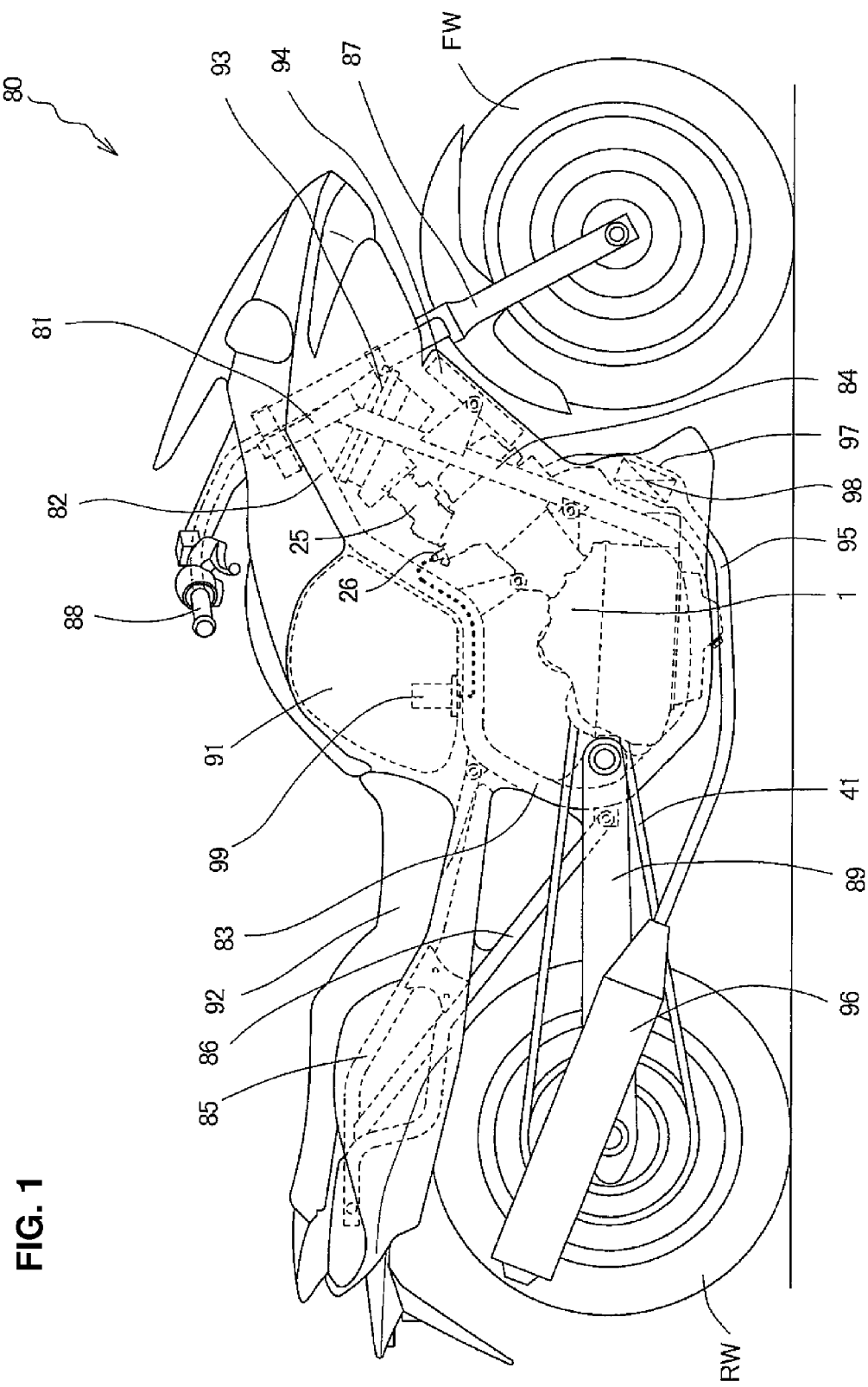
FIG. 1 is a lateral view of a motorcycle according to an illustrative embodiment of the present invention.

FIG. 1 is a lateral view of a motorcycle 80 according to an embodiment of the present invention. As shown in FIG. 1, a body frame of the motorcycle 80 includes a head pipe 81, main frames 82 extending obliquely rearward from the head pipe 81, and center frames 83 extending downward from the rear ends of the main frames 82.

The body frame of the motorcycle 80 further includes down frames 84 extending downward from the head pipe 81, seat stays 85 extending rearward from upper portions of the center frames 83, and mid frames 86 each spanned between a rear portion of the center frame 83 and a rear portion of the seat stay 85. A front fork 87 supporting a front wheel FW is steerably supported by the head pipe 81. A steering handlebar 88 is coupled to an upper portion of the front fork 87. A rear fork 89 supporting a rear wheel RW is supported vertically swingably by a rear portion of the center frame 83.

The motorcycle further includes an engine 1. The engine 1 is a two-cylinder internal combustion engine. The engine 1 is supported by the main frames 82, the center frames 83 and the down frames 84. The power of the engine 1 is transmitted to the rear wheel RW via a transmission unit 8 built in the engine 1 and via a rear wheel drive chain 41. A fuel tank 91 is mounted on the left and right main frames 82 and center frames 83 at a position located above the engine 1. A tandem seat 92 for driver and pillion passenger is mounted on the seat stays 85.

A throttle body 25 arranged continuously with an intake port of the engine 1 is coupled to an air cleaner 93. A radiator 94 is disposed frontwardly of the engine 1. An exhaust pipe 95 extending from a front surface of the engine 1 extends below the engine 1. The exhaust pipe is connected with a muffler 96 located at a rear portion of vehicle body. A catalyst case 97 of the exhaust pipe 95 is provided at a position forwardly of the engine. The catalyst case 97 receives a catalyst 98 therein. During operation of the vehicle, fuel stored the fuel tank 91 is supplied to an injector (fuel injection valve) 26 via a fuel pump 99 and then to the engine 1.

Figure 2:
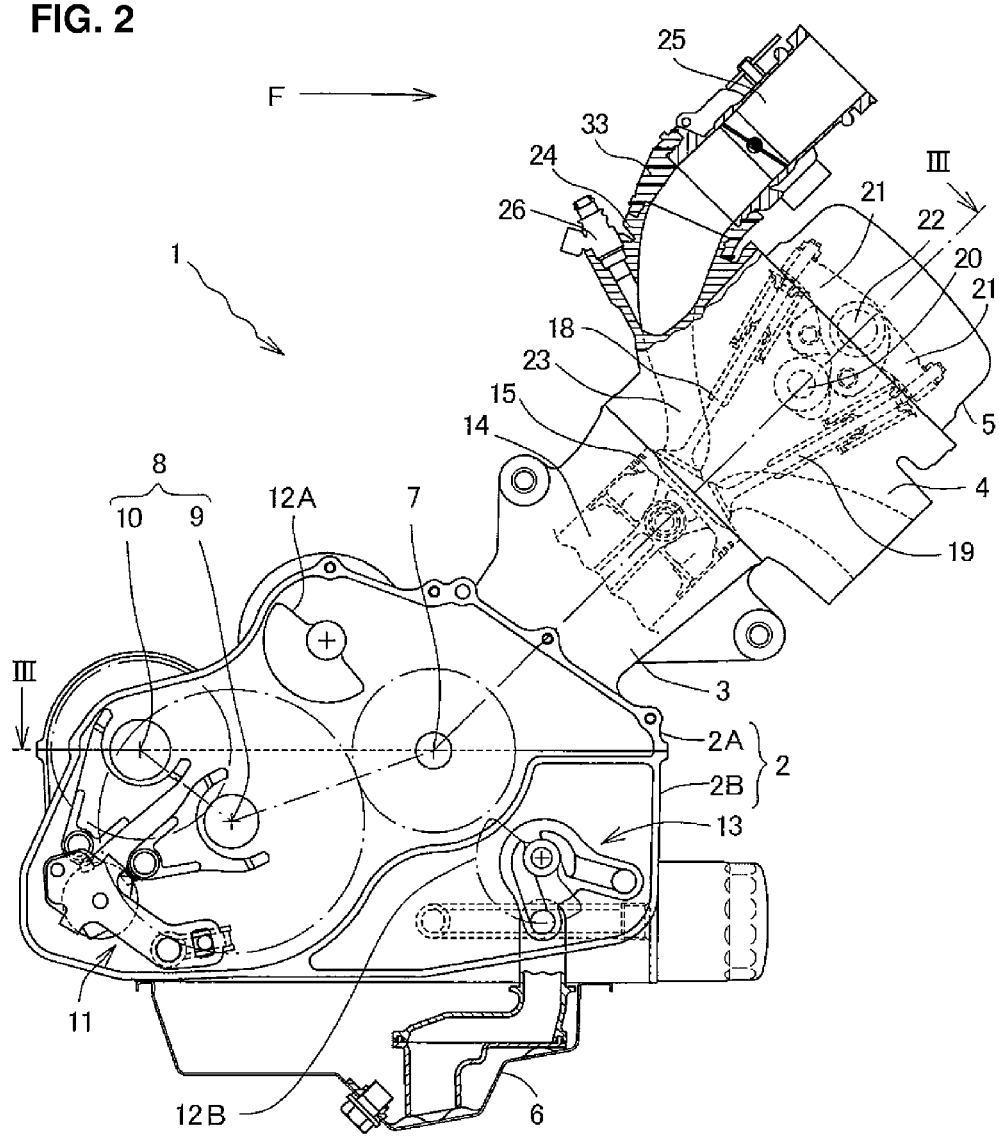
FIG. 2 is a longitudinal cross-sectional view, as viewed from the right side, of an internal combustion engine of the motorcycle.

FIG. 2 is a longitudinal cross-sectional view, as viewed from the right side, of the internal combustion engine 1 of the motorcycle 80. Arrow F indicates the front of the engine 1 corresponding to the front of the vehicle encountered when the engine 1 is mounted on the vehicle.

The engine 1 is a transmission-integral type engine, also known as a power unit. A main shell of the engine 1 includes a vertically-halved crankcase 2 composed of an upper crankcase 2A and a lower crankcase 2B, a cylinder block 3 formed integrally with the upper crankcase 2A, a cylinder head 4, a cylinder head cover 5, and an oil pan 6 formed of a thin steel plate attached to a lower surface of the lower crankcase 2B.

A crankshaft 7 and a counter shaft 10 of a constant-mesh type gear transmission unit 8 are disposed at a division surface between the upper and lower crankcases 2A, 2B. A main shaft 9 of the transmission unit 8 is disposed below and between both the crankshaft 7 and the counter shaft 10. A gear change mechanism 11 is disposed below the counter shaft 10, and rearward of the main shaft 9.

An upper balancer 12A is disposed obliquely rearward of and above the crankshaft 7. A lower balancer 12B is disposed obliquely forward of and below the crankshaft 7 at a position symmetrical to the upper balancer 12A. The balancers 12A, 12B are directly driven by the crankshaft 7. An oil pump 13 is mounted to the shaft end of the lower balancer 12B. As discussed herein, the oil pump 13 includes a scavenging pump 64 and a feed pump 65.

The cylinder block 3 is provided with two cylinders 14. A piston 15 is slidably fitted into each of the cylinders 14. Intake valves 18, exhaust valves 19, a camshaft 20, and a rocker shaft 22 provided with rocker arms 21 are arranged in the cylinder head 4. Respective intake passages 23 of the two cylinders 14 are assembled into a single one intake passage via an intake manifold portion 24 and connected to a single throttle body 25. The intake manifold portion 24 is equipped with two injectors (fuel injection valves) 26 for respective corresponding cylinders. The throttle body 25 is mounted on the intake manifold portion 24 via an insulator 33.

Figure 3:
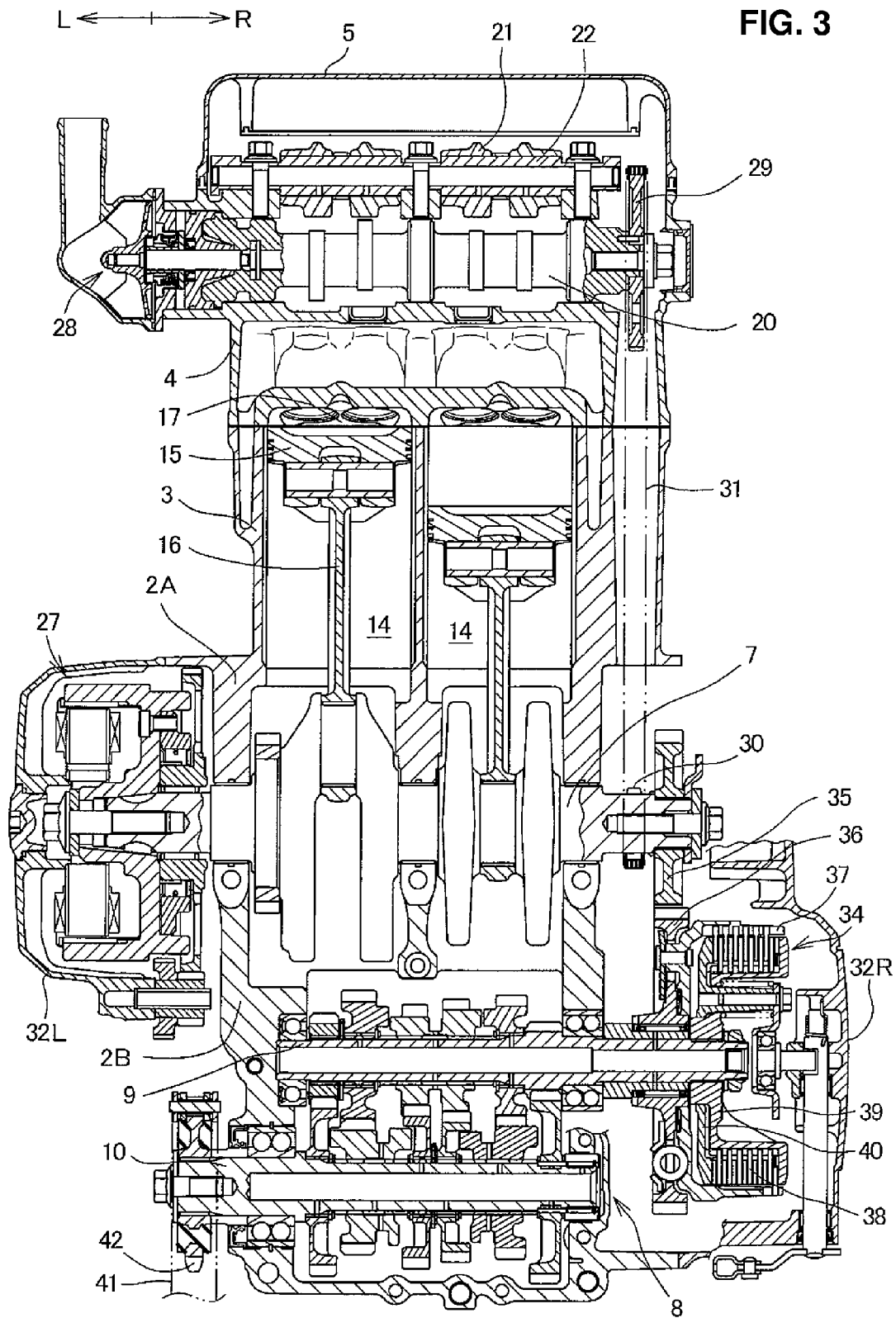
FIG. 3 is a cross-sectional view taken along line III-III of FIG. 2.

FIG. 3 is a cross-sectional view taken along line III-III of FIG. 2, and shows a horizontal-surface development view of the engine 1 including the camshaft 20, the cylinders 14, the crankshaft 7, the main shaft 9 and the counter shaft 10. In FIG. 3, arrows L and R indicate the left and right sides, respectively, of the engine 1 corresponding, respectively, to the left and right of the vehicle encountered when the engine 1 is mounted on the vehicle 80.

The shell of the engine 1 includes the lower crankcase 2B, the upper crankcase 2A, the cylinder block 3 integral with the upper crankcase 2A, the cylinder head 4, the cylinder head cover 5, the left crankcase cover 32L and the right crankcase cover 32R, starting from the underside. An AC generator 27 is mounted to the left end of the crankshaft 7 and covered by the left crankcase cover 32L. The cylinder block 3 integral with the upper crankcase 2A is provided with the two cylinders 14. The pistons 15 are slidably fitted into the respective cylinders 14, and are connected to the crankshaft 7 via corresponding connecting rods 16.

A combustion chamber 17 is defined between the upper surface of the piston 15 and the lower surface of the cylinder head 4. The single camshaft 20 is provided on the cylinder head 4. The single rocker shaft 22 provided with the rocker arm 21 is arranged above the camshaft 20. A water pump 28 is attached to the left end portion of the camshaft 20 for circulating cooling water. A camshaft driven sprocket 29 is attached to the right end of the camshaft 20 and drivingly rotated via a cam chain 31 spanned between the camshaft driven sprocket 29 and a camshaft drive sprocket 30 attached to the crankshaft 7.

The main shaft 8 and counter shaft 10 of the transmission unit 8 are arranged parallel to the crankshaft 7. A multi-disk clutch 34 is mounted to the right end of the main shaft 9, and is covered by the right crank case cover 32R. A primary driven gear 36 provided on the main shaft 9 so as to be capable of idle rotation is drivingly rotated by a primary drive gear 35 located at the right end of the crankshaft 7. The primary driven gear 36 rotates a clutch outer 37 connected to the primary driven gear 36 to rotate a clutch inner 39 via a plurality of friction plate 38. This drivingly rotates the main shaft 9 to which the clutch inner 39 is secured.

In this manner, the rotation of the crankshaft 7 is transmitted to the main shaft 9. Clutch operation releases the pressing force of the pressurizing plate 40 of the clutch 34 to reduce the friction force of the friction plates 38, which disengages the clutch 34. The constant-mesh type gear transmission unit 8 is provided on the main shaft 9 and the counter shaft 10. A rear wheel drive sprocket 42 engaged with a rear wheel drive chain 41 for driving the vehicle is attached to the left end of the counter shaft 10.

Figure 4:
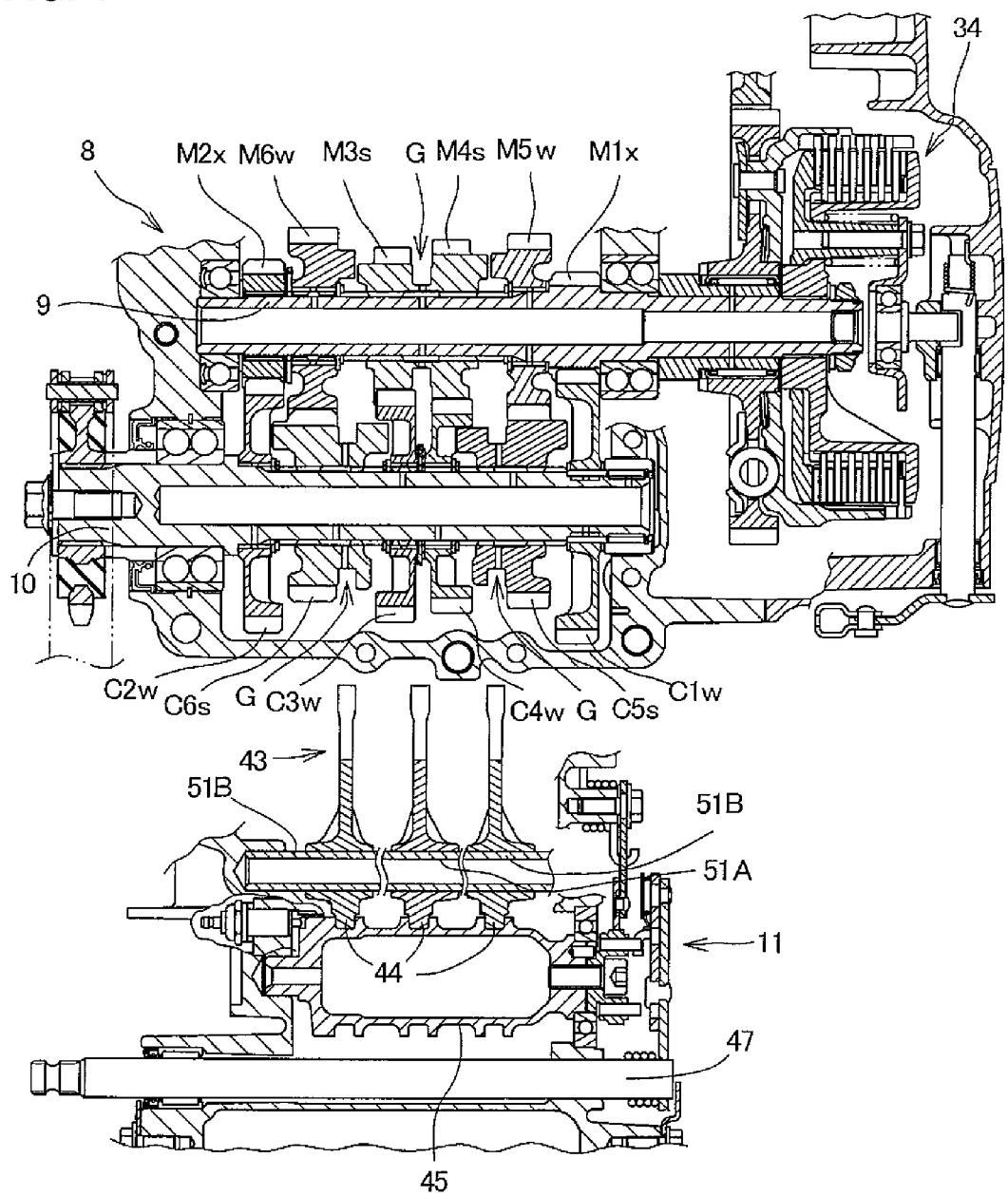
FIG. 4 is a detail cross-sectional view, partially cut away, of a constant-mesh type gear transmission unit and a gear change mechanism.

FIG. 4 is a configurational view of the constant-mesh type gear transmission unit 8 and the gear change mechanism 11. Six gears of the constant-mesh type gear transmission unit 8 are provided on each of the main shaft 9 and the counter shaft 10. Six gears M1 to M6 are provided on the main shaft 9. Six gears C1 to C6 constantly meshing with the respective gears M1 to M6 are provided on the counter shaft 10. Symbol "M" denotes main shaft-belonging gears, "C" denotes counter shaft-belonging gears, and suffixes 1 to 6 denote gears for determining the reduction ratios of first- to sixth-speeds.

In FIG. 4, subscript "x" denotes fixed gears being integral with or fixed to the shaft through spline. Subscript "w" denotes idle gears located at given positions to be capable of rotation relative to the shaft. Subscript "s" denotes slide gears held by the shaft through spline and being axially movable with rotation restricted with respect to the shaft.

The other side gear meshingly engaged with the fixed gear (subscript "x") and with the slide gear (subscript "s") is the idle gear (subscript "w"). The idle gear cannot fulfill a function as a gear alone. In order to fulfill the function as a gear, the idle gear needs to be secured to the shaft by the adjacent slide gear (subscript "s"). The slide gear (subscript "s") is provided with an engaging groove G adapted to receive a shift fork 43 engaged therewith to axially drive the gear. The two slide gears of the main shaft 9 is formed into a single piece and have the engaging groove G formed at the central portion therebetween. The shift fork 43 is driven by the gear change mechanism 11.

FIG. 4, at a lower portion thereof, illustrates the gear change mechanism 11 for driving the slide gears (subscript "s"). As shown in FIG. 4, three shift forks 43 are supported by two shift fork support shafts 51A, 51B, a shift drum 45 engaged with pins 44 of the shift forks 43, a change spindle 47, etc. A central shift fork of the three shift forks 43 is engaged with the slide gears of the main shaft 9, and the shift forks on both ends are engaged with the slide gear of the counter shaft 10.

Figure 5:
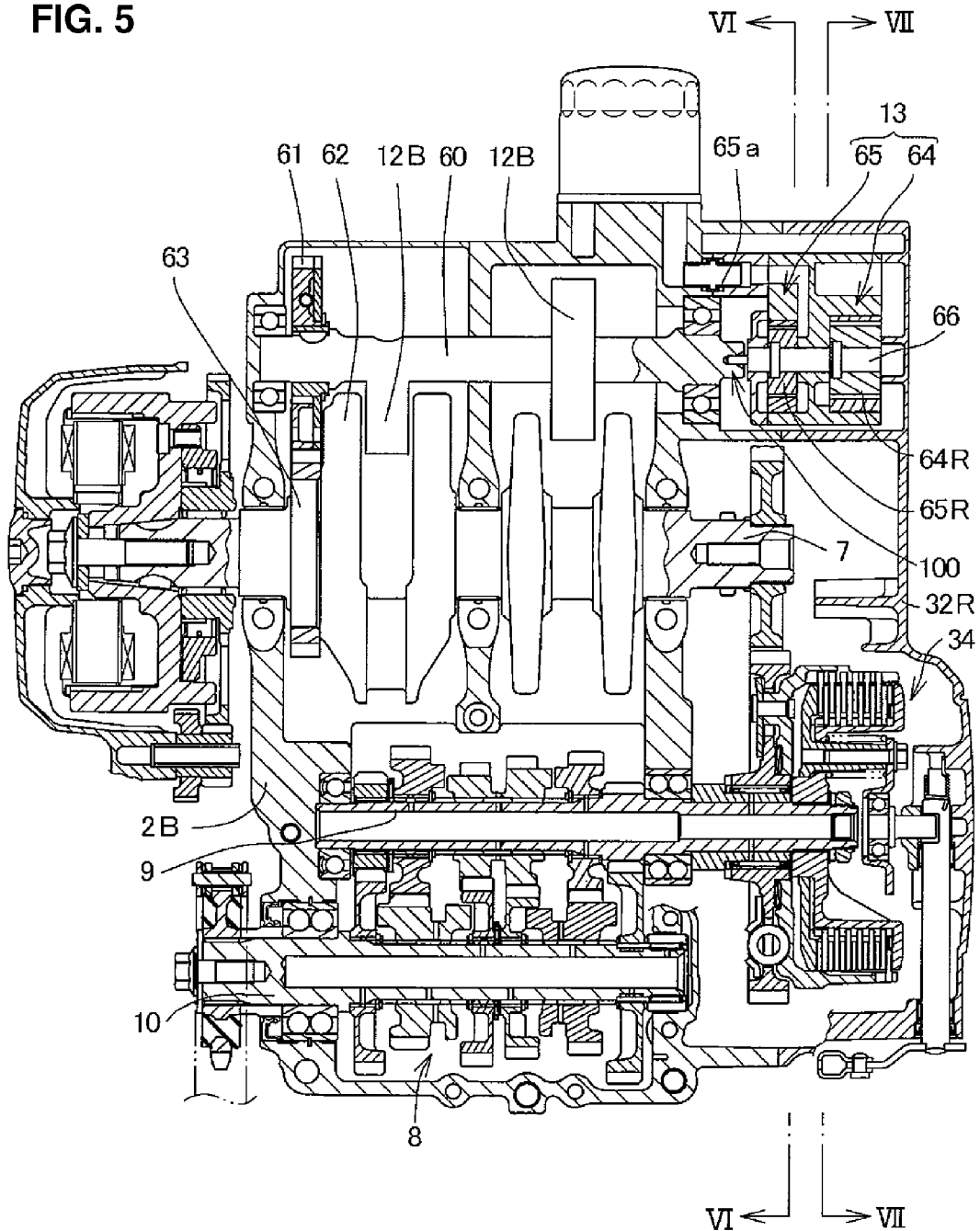
FIG. 5 is a cross-sectional view of the engine of FIG. 2, showing a lower balance shaft, a crankshaft and transmission shafts.

FIG. 5 is a cross-sectional view of the engine 1, taken along a substantially horizontal plane. The engine 1 includes the rotating shaft 60B of the lower balancer 12B, the crankshaft 7, the main shaft 9 and the counter shaft 10. The configuration of the upper balancer 12A and an upper balance shaft 60A is the same as that of the lower balancer 12B and lower balance shaft 60B. A balancer driven gear 61 provided on the left end of the lower balance shaft 60B is engaged with a balancer drive gear 63 provided adjacent to a left crank web 62 of the crankshaft 7, and has a substantially same diameter as that of the balancer drive gear 63, and thereby the lower balance shaft 60B is driven by the crankshaft 7. Also the upper balance shaft 60A is provided with a similar balancer driven gear 61, which is driven by the crankshaft 7.

The oil pump 13 includes the scavenging pump 64 and the feed pump 65 arranged at the right end of the lower balance shaft 60B. A rotor 64R of the scavenging pump 64 and a rotor 65R of the feed pump 65 are joined to a single oil pump shaft 66. The oil pump shaft 66 is engaged with the right end of the lower balance shaft 60B at a left end portion thereof, i.e., at an engaging portion 100. The oil pump 13 is configured for rotation at the same speed as that of the lower balance shaft 60B.

Figure 6:
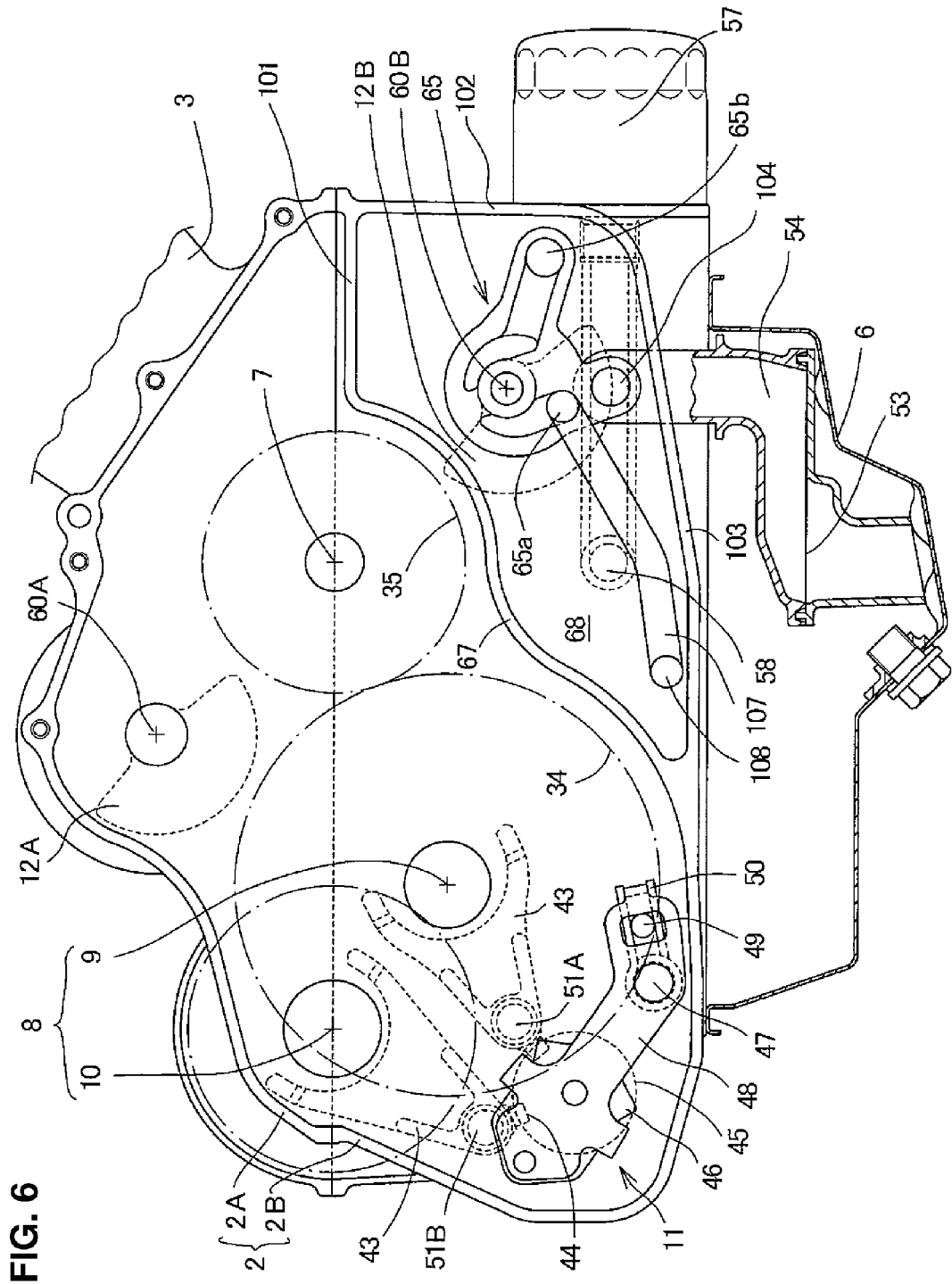
FIG. 6 is a cross-sectional view taken along line VI-VI of FIG. 5, as viewed from the right side of the engine.

FIG. 6 is a cross-sectional view taken along line VI-VI of FIG. 5 as viewed from the right side, illustrating a space between the crankcase 2 and the right crankcase cover 32R, with the right crankcase cover 32R removed. As shown in a left-half portion of FIG. 6, the gear change mechanism 11 includes the shift drum 45, a star-shaped plate 46, a change spindle 47, a change arm 48 welded to an end of the change spindle 47, a restriction bolt 49, and a change arm return spring 50, along with other related parts. The change spindle 47 is operatively turned to move the change arm 48, which intermittently turns the star-shaped plate 46 and the shift drum 45. In response to this, the shift fork 43 is moved via a pin 44 for operatively shifting gears of the transmission unit 8 up or down.

As shown in a right-half portion of FIG. 6, a partition wall 67 is formed along portions of outer circumferences of the clutch 34 and the primary drive gear 35.

The partition wall 67 splits a space between the crankcase 2 and the right crankcase cover 32R into two spaces. Of the two spaces, a space not including the clutch 34 is used as an oil storage chamber 68. The partition wall 67 extends along the outer circumference of the primary drive gear 35 and merges with an upper edge portion 101 of the lower crankcase 2B extending along the crankcase vertical-split surface including the crankshaft 7. The upper edge portion 101 of the lower crankcase 2B further merges with a front wall 102 and a lower wall 103 of the lower crankcase 2B and of the right crankcase cover 32R. Thus, the partition walls, i.e., the front and lower walls 102, 103 and the partition wall 67, are formed annularly continuous with one another for defining a closed space as the oil storage chamber 68.

The scavenging pump 64 and the feed pump 65 are housed in the oil storage chamber 68. In addition, the scavenging pump 64 and the feed pump 65 are arranged to overlap each other as viewed from the right side. The feed pump 65 (in the back) is shown in FIG. 6. An oil suction pipe 54 equipped with an oil strainer 53 is installed in the oil pan 6. An upper end of the oil suction pipe 54 is connected with a suction port 105 of the scavenging pump 64 via an oil passage 104 extending in the direction of the crankshaft (FIG. 7).

In a wet sump type engine in which a volume of oil is stored in an oil pan, the oil pan is formed from relatively thick material, because of requirement of high rigidity of the oil pan. However, as described above, the oil storage chamber 68 for storing oil therein is provided in a lateral portion of the crankcase 2. Therefore, the oil pan 6 can be replaced with a press-molded component formed of a thin steel plate.

Figure 7:
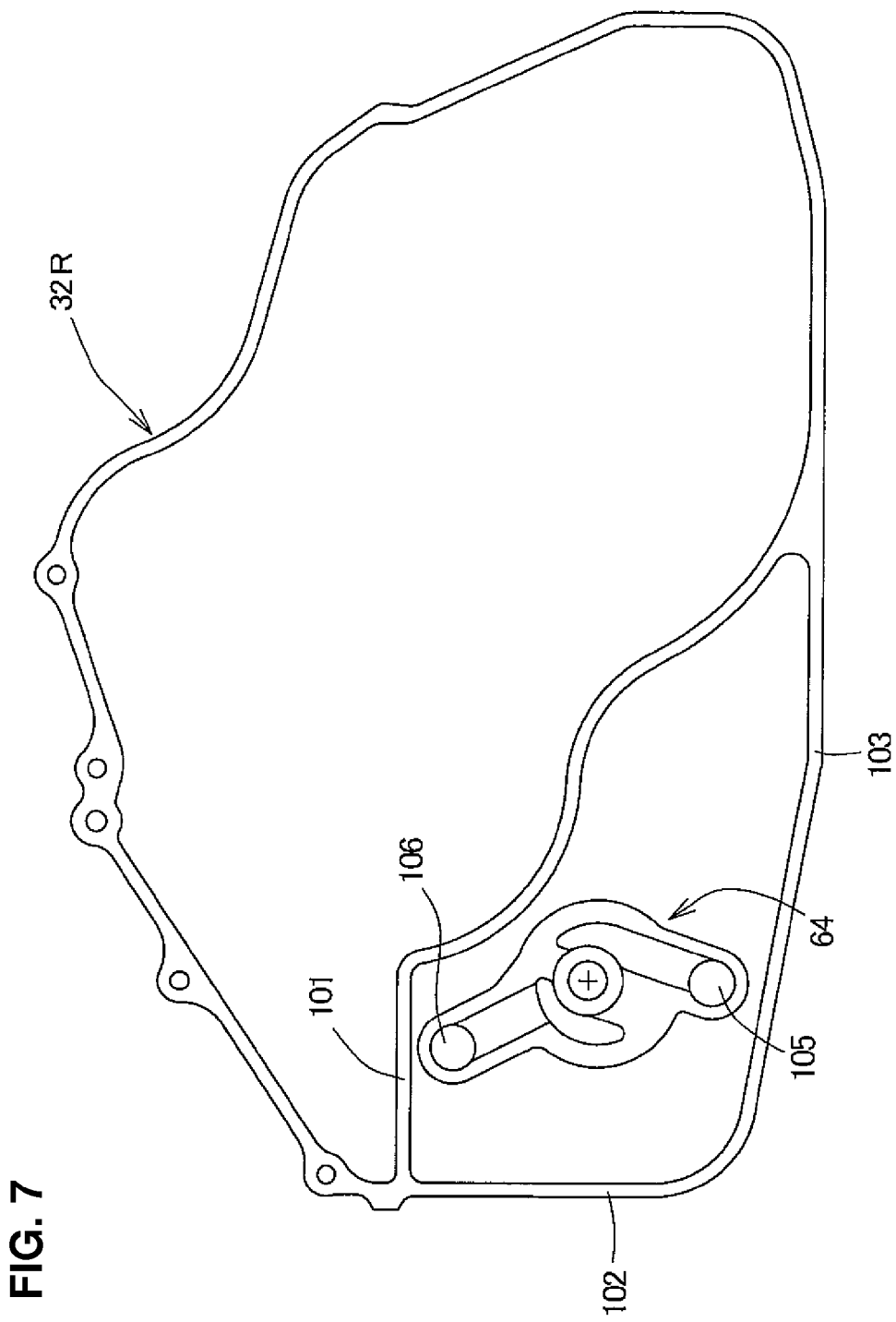
FIG. 7 is a cross-sectional view taken along line VII-VII of FIG. 5, as viewed from the left side of the engine.

FIG. 7 is a cross-sectional view taken along line VII-VII of FIG. 5 as viewed from the left side of the engine. In FIG. 7, illustration of the clutch 34 is omitted for clarity. Oil discharged from a discharge port 106 of the scavenging pump 64 is stored in the oil storage chamber 68 (FIG. 7).

The oil thus stored is drawn in through the suction port 108 of the oil suction pipe 107 (FIG. 6), further sucked from the suction port 65a of the feed pump 65 via the oil suction pipe 107, discharged from the discharge port 65b, and supplied to the oil filter 57 at the front wall of the crankcase 2 connecting with the discharge port 65b. Filtered oil is supplied to lubricating portions and components of the engine 1 via a main gallery 58.

The illustrative embodiment of the present invention, as described above in detail, provides the following effects.

(1) The partition wall 67 extending along the outer circumference of the clutch 34 splits the space between the lower crankcase 2B and the right crankcase cover 32R into the two chambers. One of them, not including the clutch 34, is allowed to serve as the oil storage chamber 68, which allows for oil storage between the lower crankcase 2B and the right crankcase cover 32R.

Thus, since the clutch 34 does not dip into oil, clutch release performance is not affected, thereby ensuring that the disengagement performance of the clutch can be extended. The oil storage chamber 68 of the engine formed of the vertically split crankcase 2A, 2B is formed of only the lower crankcase 2B without straddling the upper and lower crankcases. Thus, the amount of stored oil can be ensured at a maximum while ensuring liquid-tight performance.

(2) The oil storage chamber 68 is formed as the closed space defined by the partition wall 67 avoiding the clutch 34 and the primary drive gear 35, the upper edge portion 101 of the lower crankcase 2B and the front wall 102 and lower wall 103 of the oil storage chamber 68. Therefore, the stored oil will not be stirred by the clutch 34 or by the primary drive gear 35. Thus, the bubbling and foaming of the oil is suppressed, to thereby slow the progression of degradation of the oil. In addition, air entrainment can be suppressed on the oil supply side.

(3) The scavenging pump 64 is operatively connected to the end of the lower balance shaft 60B, and is disposed in the oil storage chamber 68. A vacant space occurs on the side of the balance shaft 60 (which is axially shorter than the crankshaft 7) and the transmission shafts 9, 10. Such vacant space is used for forming the oil storage chamber 68 therein, and further the scavenging pump 64 disposed therein is driven by the balance shaft 60.

Accordingly, the oil storage chamber 68 is not enlarged in the direction of the crankshaft, that is, the vacant space is used for compactification. Further, also the pump drive mechanism can be made to have a simple structure by use of the vacant space so that the overall engine can be downsized.

(4) The oil storage chamber 68, the scavenging pump 64, the feed pump 65 and the oil filter 57 are collectively arranged in the front portion of the crankcase 2. Thus, the oil passage connecting them together can be shortened for providing the compact configuration of the engine.

(5) The oil suction pipe 107 is arranged to extend along the lowest portion of the oil storage chamber 68, and is coupled to the suction side of the feed pump 65. Thus, the oil collected on the lowest portion of the oil storage chamber can reliably be sucked through the suction pipe 107.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An oil storage structure for an engine,
said oil storage structure comprising an oil storage chamber;
said engine comprising:

a crankshaft;

a transmission shaft;

a crankcase rotatably supporting said crankshaft and said transmission shaft; said crankcase forming at least a transmission chamber, a clutch mechanism comprising a clutch arranged on an end portion of the transmission shaft projecting laterally from the crankcase, and a crankcase cover joined to the crankcase, said crankcase cover configured to help define said oil storage chamber adapted to store oil therein, wherein:

the crankcase is vertically split into an upper crankcase and a lower crankcase, and said crankshaft is disposed between the upper and lower crankcases;

the crankcase cover is formed with a partition wall therein extending along an outer circumference of the clutch mechanism, as viewed in an direction of the transmission shaft, the partition wall splits a space between the crankcase and the crankcase cover into a plurality of chambers, and of the plurality of chambers, a chamber spaced apart from said clutch mechanism is said oil storage chamber, and an upper edge portion of the partition wall is at least partially disposed along a case-split surface of the crankcase such that the oil storage chamber is defined by said lower crankcase and said crankcase cover.

2. An oil storage structure for an engine according to claim 1, wherein the partition wall extends along a portion of an outer circumference of the clutch mechanism, extends along a portion of an outer circumference of a primary drive gear driven by the crankshaft to drive the clutch mechanism, and then merges with an upper edge portion of the lower crankcase extending along a crankcase plain surface portion including the crankshaft;

and wherein the upper edge portion of the lower crankcase is merged with a front wall and a lower wall of the lower crankcase thereby annularity, and consequently forming the oil storage chamber as a closed chamber.

3. An oil storage structure for an engine according to claim 1, wherein the engine further comprises:

a balance shaft disposed below the crankshaft; and a scavenging pump disposed in the oil storage chamber; wherein said scavenging pump pump is coaxially joined to an end portion of the balance shaft, is operatively connected therewith, and is operable to supply pressurized oil to the oil storage chamber.

4. An oil storage structure for an engine according to claim 2, wherein the engine further comprises:

a balance shaft disposed below the crankshaft; and a scavenging pump disposed in the oil storage chamber; wherein said scavenging pump is coaxially joined to an end portion of the balance shaft, is operatively connected therewith, and is operable to supply pressurized oil to the oil storage chamber.

5. An oil storage structure for an engine according to claim 3, wherein the engine further comprises:

a feed pump arranged coaxially with the scavenging pump, said feed pump being adapted to feed oil from the oil storage chamber to various components of the engine; and an oil filter connected to an oil passage located on a discharge side of the feed pump provided at a front wall of the lower crankcase adjacent to the oil storage chamber.

6. An oil storage structure for an engine according to claim 1, wherein said engine further comprises:

a feed pump; and an oil suction pipe extending along a lower portion of the oil storage chamber and connected to a suction side of said feed pump.

7. An oil storage structure for an engine according to claim 2, wherein said engine further comprises:

a feed pump; and an oil suction pipe extending along a lower portion of the oil storage chamber and connected to a suction side of said feed pump.

8. An oil storage structure for an engine according to claim 3, wherein said engine further comprises:

a feed pump; and an oil suction pipe extending along a lower portion of the oil storage chamber and connected to a suction side of said feed pump.

9. An oil storage structure for an engine according to claim 5, wherein said engine further comprises an oil suction pipe extending along a lower portion of the oil storage chamber and connected to a suction side of the feed pump.

10. An internal combustion engine, comprising a crankshaft;

a transmission shaft operatively connected with said crankshaft;

a crankcase rotatably supporting said crankshaft and said transmission shaft therein; the crankcase being vertically split into an upper crankcase and a lower crankcase;

a clutch mechanism comprising a clutch arranged on an end portion of the transmission shaft;

a crankcase cover joined to the crankcase;

a partition wall extending along an outer circumference of the clutch mechanism, as viewed in an direction of the transmission shaft;

wherein the partition wall splits a space between the lower crankcase and the crankcase cover into a pair of chambers including a clutch mechanism chamber and an oil storage chamber;

wherein said oil storage chamber is separate from said clutch mechanism chamber;

an upper edge portion of the partition wall is at least partially disposed along a case-split surface such that the oil storage chamber is formed only by said lower crankcase and the crankcase cover.

11. An internal combustion engine according to claim 10, wherein:

said lower crankcase comprises an upper edge portion, a front wall connected to the upper edge portion, and a lower wall connected to the front wall;

the partition wall extends along the outer circumference of the clutch mechanism, then extends along an outer circumference of a primary drive gear driven, and merges with the upper edge portion of the lower crankcase extending along a portion of said case-split surface; and the upper edge portion and the lower wall of the lower crankcase are merged with the partition wall for annularity forming the oil storage chamber as a closed chamber.

12. An internal combustion engine according to claim 10, further comprising a balance shaft disposed below the crankshaft; and a scavenging pump disposed in the oil storage chamber; said scavenging pump being coaxially joined to, and operatively connected with an end portion of the balance shaft;

wherein said scavenging pump is operable to supply pressurized oil to the oil storage chamber.

13. An internal combustion engine according to claim 11, further comprising:
   a balance shaft disposed below the crankshaft; and
   a scavenging pump disposed in the oil storage chamber; said scavenging pump being coaxially joined to, and operatively connected with an end portion of the balance shaft;
   wherein said scavenging pump is operable to supply pressurized oil to the oil storage chamber.

14. An internal combustion engine according to claim 12, further comprising:
   a feed pump arranged coaxially with the scavenging pump, said feed pump being adapted to feed oil from the oil storage chamber to various components of the engine; and
   an oil filter arranged at a front wall of the crankcase adjacent to the oil storage chamber, said oil filter fluidly connected with an oil passage located on a discharge side of the feed pump.

15. An internal combustion engine according to claim 10, further comprising:
   a feed pump; and
   an oil suction pipe extending along a lower portion of the oil storage chamber and connected to a suction side of the feed pump.

16. A vehicle comprising a two-cylinder internal combustion engine, said engine comprising
   a crankshaft;
   a transmission shaft operatively connected with said crankshaft;
   a crankcase rotatably supporting said crankshaft and said transmission shaft therein; said crankcase comprising an upper crankcase and a lower crankcase;
   a clutch mechanism comprising a clutch arranged on an end portion of the transmission shaft;
   a crankcase cover joined to the crankcase;
   a partition wall extending along an outer circumference of the clutch mechanism, as viewed in an direction of the transmission shaft,
   wherein the partition wall splits a space between the lower crankcase and the crankcase cover into a pair of chambers including a clutch mechanism chamber and an oil storage chamber;
   wherein said oil storage chamber is separate from said clutch mechanism chamber, and is formed only by said lower crankcase, the crankcase cover and the partition wall.

17. A vehicle according to claim 16, wherein:
   said lower crankcase comprises an upper edge portion, a front wall connected to the upper edge portion, and a lower wall connected to the front wall;
   the partition wall extends along the outer circumference of the clutch mechanism, then extends along an outer circumference of a primary drive gear driven, and merges with the upper edge portion of the lower crankcase extending along a portion of said case-split surface; and
   the upper edge portion and the lower wall of the lower crankcase are merged with the partition wall for annularity forming the oil storage chamber as a closed chamber.

18. A vehicle according to claim 16, wherein said engine further comprises:
   a balance shaft disposed below the crankshaft; and
   a scavenging pump disposed in the oil storage chamber, said scavenging pump being coaxially joined to and operatively connected with an end portion of the balance shaft, said scavenging pump operable to supply pressurized oil to the oil storage chamber.

19. A vehicle according to claim 18, further comprising:
   a feed pump arranged coaxially with the scavenging pump, said feed pump being adapted to feed oil from the oil storage chamber to various components of the engine; and
   an oil filter arranged at a front wall of the crankcase adjacent to the oil storage chamber, said oil filter fluidly connected with an oil passage located on a discharge side of the feed pump.

20. A vehicle according to claim 19, further comprising an oil suction pipe extending along a lower portion of the oil storage chamber and connected to a suction side of the feed pump.

\* \* \* \* \*